May 26, 1942.  W. E. SCHAUER  2,284,451
BATTERY PACK FOR ELECTRICAL HEARING AIDS
Filed May 3, 1941
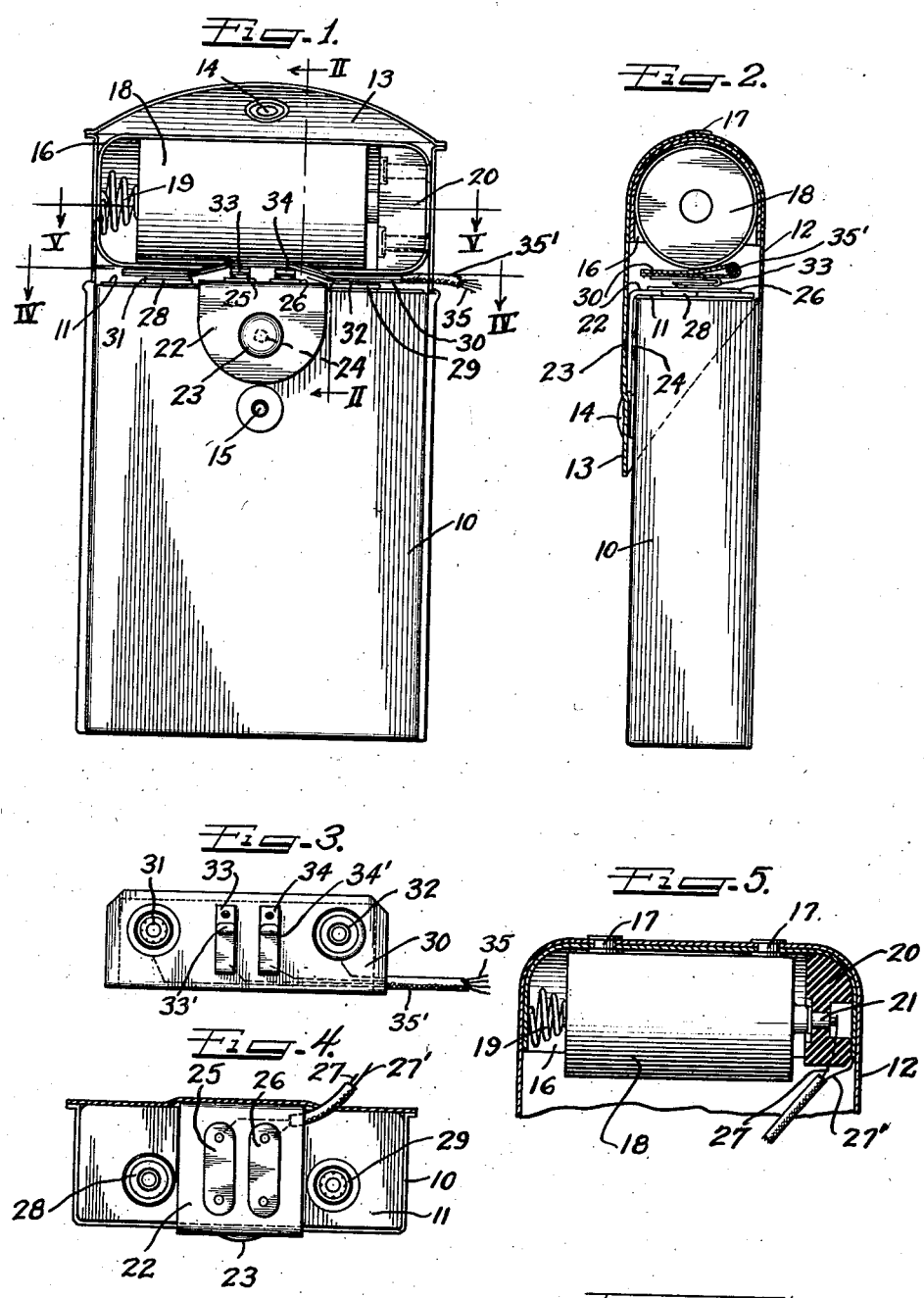
Inventor
WALTER E. SCHAUER.

Patented May 26, 1942

2,284,451

UNITED STATES PATENT OFFICE 2,284,451

BATTERY PACK FOR ELECTRICAL HEARING AIDS

Walter E. Schauer, Forest Park, Ill., assignor to Otarion, Inc., Chicago, Ill., a corporation of Illinois Application May 3, 1941, Serial No. 391,762

4 Claims. (Cl. 136—171)

This invention relates to hearing aid outfits usually employed by persons with defective hearing, the invention concerning particularly an improved unitary battery pack or assembly for supplying "A" battery current and "B" battery current for thermionic tubes, sound receiving microphone structure, and other controlling elements housed within a compact case carried in the pocket or supported from the clothing and from which microphone and sound amplifying assembly a conductor leads to an earpiece.

An important object of my invention is to provide an enclosing case for the battery constructed of suitable material, such as leather, and to insert the "B" battery into the body of the case and the "A" battery into a hinged cover structure or closure for the case so that when the case is closed it will be in compact substantially rectangular form with the "A" battery end semi-cylindrical and rounded so that it may be conveniently carried in a pocket with the rounded "A" battery end down to eliminate the engagement of sharp corners with the pocket bottom.

A further important object of the invention is to provide a rigid, preferably metallic, frame of substantially semi-circular cross-section carried in the top of the casing cover structure to define the semi-cylindrical top of the cover structure and also to suport the "A" battery.

A further object is to provide a flap secured to and extending from the upper part of the backwall of the casing body to be applied around the top of the "B" battery to lock the battery within the casing body and also to support terminals connected with the "A" battery.

A further object is to provide a terminal pad supporting terminals for engaging with the "B" battery terminals and other terminals for engaging with the "A" battery terminals on the flap, with the arrangement such that when this pad is applied and the casing cover structure is closed, the "A" battery will be forced down against the terminal pad to securely engage and hold the pad terminals in contact with the respective battery terminals.

The above enumerated and other features of the invention are embodied in the structure shown on the drawing, in which drawing:

Figure 1 is a front elevation of the pack with the cover structure in open position;

Figure 2 is a side elevation of the pack with the cover closed, and partly in section on line II—II of Figure 1;

Figure 3 is a plan view of the terminal pad;

Figure 4 is a section in plane IV—IV of Figure 1; and

Figure 5 is a section in plane V—V of Figure 1.

The case shown comprises a rectangular body 10 preferably of comparatively flexible material, such as leather, and dimensioned to receive a "B" battery 11. The hood or cover structure 12 for the top of the casing body 10 is also of material such as leather so as to have hinge connection with the body along the top of the back wall thereof for swinging to open position (Figure 1) or to closed position (Figure 2). When the cover structure is closed its side walls partially overlap the sides of the body and its front wall partially overlaps the front wall of the body and terminates in a flap or tongue section 13 having a snap socket 14 for engagement with a snap button 15 secured to the casing front wall.

Within the top portion of the cover structure is a frame or shell 16 of metal or other suitable material. This shell is of substantially semi-circular transverse section and is secured to the cover top as by rivets 17, the shell extending with its ends against the sides of the cover, the shell giving the top of the cover a semi-cylindrical shape, the corners of the shell being rounded so that the corners of the cover top may be likewise rounded so that when the case is carried in the pocket with the cover end down there will be no sharp corners to wear out the pocket bottom.

The shell 16 also serves as a holder for the "A" battery 18. A coiled spring 19 is secured to and extends from one end of the casing for engagement with the base of the "A" battery, and to the other end of the shell is secured an insulating block 20 which mounts the contact 21 for engagement with the terminal tip of the "A" battery. The spring 19 electrically connects the cylindrical casing of the battery with the frame or shell 16 and by its pressure engagement with the battery it holds it in the frame 16 from which it may readily be removed when desired.

Secured to the back wall of the casing 10 adjacent the top thereof is a tab or flap 22 for extension across the top of the "B" battery 11 and engagement of its snap socket 23 with a snap button 24 secured to the front wall of the casing body 10, one function of the flap being thus to hold the "B" battery in the casing.

The flap 22 has secured on its upper side the contact plates 25 and 26 connected by conductors 27 and 27' respectively with the frame 16 and the contact 21 in the block 20 so that the contact plates 25 and 26 on the flap will constitute the terminals of the battery circuit, The flap, when secured, lies between the terminals 28 and 29 of the "B" battery and with the battery circuit terminal plates extending across the top of the "B" battery between the "B" battery terminals.

A terminal pad 30, which may also be of leather or other suitable material, supports contacts 31 and 32 for engagement with the "B" battery terminals 28 and 29 respectively, and contacts 33 and 34 for engagement with the battery circuit terminal plates 25 and 26 on the flap 22. In order that the terminal pad may be properly applied, and releasably locked to the "B" battery, one of the terminals, such as the terminal 28 of the battery may be in the form of snap socket and the corresponding contact 31 on the terminal pad may be a snap button for engaging in the socket, and the other terminal 29 of the "B" battery would then be a snap button for receiving the snap socket 32 on the terminal pad. When the pad is applied with its terminals into snap engagement with the battery terminals, the contacts 33 and 34 on the pad will be held in engagement with the battery circuit terminal plates 25 and 26. Preferably the pad contacts 33 and 34 terminate in spring ends 33' and 34' for more secure contact with the "A" battery terminal plates. The arrangement of the "A" battery in the cover of the casing is such that when this cover structure is closed and locked, the "A" battery will engage the terminal pad and exert pressure thereagainst for holding the pad contact securely in engagement with the "B" battery terminals and the "A" battery terminal plates on the flap 22. Wires 35 extend from the terminal pad contacts for conducting the battery current to the microphone and other elements within a microphone case (not shown), and the conductors are twisted into a compact cable or cord 35'. This cord may project from the rear corner of the pad 30 and between the adjacent side walls of the casing body and the cover when the cover is closed.

I have shown and described a practical and efficient embodiment of the features of my invention but I do not desire to be limited to the exact construction and arrangement shown and described as changes and modifications may be made without departing from the scope of the invention.

I claim as my invention:

1. A battery pack comprising a casing body and a "B" battery therein, a cover for said body having hinge connection with one end thereof, a frame secured in said cover and an "A" battery supported thereby, a flap on said body adapted to be detachably secured across the top of said body and the "B" battery therein, terminal plates on said flap connected with the "A" battery terminals and disposed between the terminals of said "B" battery when said flap is in secured position, a current supply circuit terminal pad for insertion between said casing body and cover and having terminals for engagement with the "B" battery terminals and having other terminals for engagement with said "A" battery terminals, the "A" battery being adapted upon closure of said cover to engage with and exert pressure against said terminal pad for secure engagement of its terminals with the battery terminals.

2. A battery pack for electrical hearing aids comprising a rectangular casing body and a "B" battery therein, a flap on said body extensible across the top thereof to overlie the top of said "B" battery between the battery terminals, means supporting an "A" battery within said cover, terminal plates for said battery mounted on said flap to be located between the "B" battery terminals, a removable flexible terminal pad for conductors for receiving current from said batteries, said pad having terminals engageable with the "B" battery terminals and having other terminals engageable with said "A" battery terminals, and means for releasably holding said cover closed with said "A" battery in pressure engagement with said pad for holding the pad terminals in secure engagement with said battery terminals.

3. A battery pack for hearing aids comprising a rectangular casing body receiving a "B" battery, a rectangular cover for said body having a top of semi-circular cross-section, a supporting frame within said cover secured to the top thereof and having circuit terminals at its ends, an "A" battery releasably supported in said frame between said terminals, a flap on said casing extensible across the top of the "B" battery between the terminals of said battery for holding said battery in said body, terminal plates on said flap connected with said frame terminals, a terminal pad for external conductors insertable between said casing body and cover and having terminals engageable with the "B" terminals and having other terminals engageable with said "A" battery terminal plates, and means for releasably locking said cover in closed position with said "A" battery in pressure engagement with said pad for holding said pad terminals securely against said battery terminals.

4. A battery pack for hearing aids comprising a rectangular casing body of comparatively flexible material such as leather, a rectangular cover for said casing of flexible material such as leather and having its upper portion of semi-cylindrical shape, the rear wall of said cover connecting with the upper end of the rear wall of said casing body whereby said cover may be swung to open or closed position, a supporting frame secured within the semi-cylindrical portion of said cover, an "A" battery detachably mounted in said supporting frame, a "B" battery in said casing body, a flap extending from the upper end of the rear wall of said casing for extension across the top of said "B" battery and detachable means securing the front edge of said flap to the front wall of said casing body whereby to hold said "B" battery in said casing body, terminal plates on said flap disposed between the terminals of said "B" battery when said flap is in secured position, said terminal plates being connected with the terminals of said "A" battery, a terminal pad of flexible material having contacts for engagement with the "B" battery contacts and having other contacts engageable with said battery terminal plates on said flap, and a flap extending from the front wall of said cover and detachable means for securing said flap to the front wall of said casing body to hold said cover in closed position, said cover flap when secured holding said "A" battery with pressure engagement against said pad for holding said pad terminals securely against said battery terminals.

WALTER E. SCHAUER.